United States Patent [19]

Zhdanovich et al.

[11] 4,361,543
[45] Nov. 30, 1982

[54] PROCESS FOR PRODUCING POLYCRYSTALS OF CUBIC BORON NITRIDE

[76] Inventors: Gennady M. Zhdanovich, ulitsa Chervyakova, 4, kv. 35; Alexandr I. Dudyak, ulitsa Tikotskogo, 22, kv. 55; Mikhail I. Galkov, ulitsa Vaneeva, 6, kv. 30, all of Minsk; Vladimir P. Baraban, ulitsa Frunze, 5, kv. 83, Poltava; Jury V. Zherebtsov, ulitsa Frunze, 88, kv. 71, Poltava; Anatoly P. Zholob, ulitsa K. Libknekhta, 118, Poltava, all of U.S.S.R.; Mikhail M. Zhuk, late of Minsk, U.S.S.R.; by Galina K. Zhuk, administrator, Oishevskogo, 4, kv. 62, Minsk, U.S.S.R.

[21] Appl. No.: 372,409

[22] Filed: Apr. 27, 1982

[51] Int. Cl.$^3$ .............................................. C01B 21/06
[52] U.S. Cl. ................................................... 423/290
[58] Field of Search ................... 423/290; 51/307, 309

[56] References Cited

U.S. PATENT DOCUMENTS 3,876,751  4/1975  Alexeevsky et al. ............... 423/290
4,150,098  4/1979  Sirota et al. ......................... 423/290

Primary Examiner—G. O. Peters
Attorney, Agent, or Firm—Ladas & Parry

[57] ABSTRACT

A process for producing polycrystals of cubic boron nitride which comprises exposure of hexagonal boron nitride to a pressure of from 40 to 70 kbar at a temperature of from 1,200° to 1,800° C. When the conversion of hexagonal boron nitride to cubic boron nitride reaches 20 to 65% by weight, the heating is switched off and pressure is increased to a value of from 80 to 120 kbar. Then the heating is resumed and temperature is elevated to 1,800°–3,000° C. Under these conditions the process is continued to full conversion of hexagonal boron nitride to cubic modification thereof.

The process can be conducted in the presence of 0.5 to 10% by weight of a catalyst contributing to the conversion of hexagonal boron nitride into its cubic modification. The main portion of the catalyst is concentrated in the central portion of the volume of hexagonal boron nitride, the remainder - in the peripheral portion.

The present invention is useful in the manufacture of super-hard materials which, in turn, can be used in the industry of cutting tools.

5 Claims, No Drawings

PROCESS FOR PRODUCING POLYCRYSTALS OF CUBIC BORON NITRIDE

FIELD OF THE INVENTION

The present invention relates to processes for the production of super-hard materials and, more particularly, to processes for producing polycrystals of cubic boron nitride which can be used for the manufacture of cutting tools, drilling bits, milling cutters, and the like.

BACKGROUND OF THE INVENTION

Known in the art is a process for producing polycrystals of cubic boron nitride comprising application of a high pressure of from 60 to 90 kbar and a temperature of from 1,800° to 2,800° C. to hexagonal boron nitride (cf. French Pat. No. 2,129,200). The final product has good cutting properties in impactless turning, however, it operates unsatisfactorily upon machining of workpieces with a discrete or intermittent surface (i.e. the surface having recesses, grooves, openings), since it possesses insuffivient mechanical strength. A higher strength is inherent in the polycrystals produced by the process taught in U.S. Pat. No. 3,212,852, wherein the treatment of the starting hexagonal boron nitride is conducted under a pressure of above 100 kbar. However, the final product is less suitable for machining of discrete surfaces of workpieces due to a rapid wear thereof. British Pat. No. 1,513,990 teaches a process for producing polycrystals of a superhard material of dense modifications of boron nitride, comprising application of a pressure of from 50 to 90 kbar at a temperature within the range of from 1,800° to 2,800° C. onto hexagonal or wurtzite boron nitride, whereinto additionally introduced is aluminium, boron or aluminium borides uniformly distributed over the entire volume thereof. As to its cutting ability and wear-resistance, the super-hard material produced according to said British Pat. No. 1,513,990 is substantially superior to the above-described materials, though its wear-resistance is considerably reduced upon machining of workpieces with discrete surfaces. The reason for such a low wear-resistance of the material disclosed in British Pat. No. 1,513,990 resides in its low compression strength.

Therefore, improvement of strength characteristics of polycrystals of cubic boron nitride will make it possible to enhance their wear-resistance in machining of parts having intermittent surface, i.e. increase their resistance to shock loads.

OBJECT OF THE INVENTION

It is an object of the present invention to provide a process for producing polycrystals of cubic boron nitride which would have increased durability characteristics and, hence, an increased wear-resistance in machining of parts with intermittent surfaces.

SUMMARY OF THE INVENTION

This object is accomplished by a process for producing polycrystals of cubic boron nitride, comprising exposure of hexagonal boron nitride to high pressures and temperatures, wherein, according to the present invention, hexagonal boron nitride is subjected to a pressure of from 40 to 70 kbar at a temperature ranging from 1,200° to 1,800° C.; when the conversion of hexagonal boron nitride to cubic boron nitride reaches 20 to 65% by weight, the heating is discontinued and pressure is increased to 80-120 kbar; when this pressure value is reached, the heating is resumed and temperature is elevated to 1,800°-3,000° C. and the process is conducted for a period sufficient to completely convert hexagonal boron nitride to cubic boron nitride.

The process of the present invention enables the production of polycrystals of cubic boron nitride having compression strength as high as 465 kg/mm$^2$, whereas the compression strength of polycrystals of cubic boron nitride produced by known processes is within the range of from 110 to 170 kg/mm$^2$. The increased mechanical strength of polycrystals of cubic boron nitride makes it possible to solve the problem of increasing wear-resistance of cutting tools. A cutting tool equipped with a polycrystal of cubic boron nitride possessing an increased mechanical strength manifests a higher wear-resistance and a better durability in machining of articles with intermittent surface.

In accordance with the present invention, it is advisable to introduce, into hexagonal boron nitride, from 0.5 to 10% by weight of a catalyst contributing to conversion of hexagonal boron nitride to cubic one. The catalyst accelerates the process of conversion of hexagonal boron nitride to the cubic modification thereof. As the catalyst use can be made of alkali and alkali-earth metals, their borides and nitrides, tin, lead, antimony, aluminium and silicon, their mixtures, alloys, borides and nitrides, since these catalysts are most stable in air, do not decompose and improve physico-mechanical properties of polycrystals of cubic boron nitride. The catalyst is non-uniformly distributed within the volume of hexagonal boron nitride so that in the peripheral portion its content is 2–5 times smaller than in the central portion. This distribution of the catalyst ensures that in the central portion the process of conversion proceeds at a higher rate than in the peripheral portion. As a result, the number of defects in the resulting polycrystals is reduced and its mechanical strength characteristics are improved.

DETAILED DESCRIPTION OF THE INVENTION

As the starting stock use is made of hexagonal boron nitride with a particle size of from 0.1 to 15 $\mu$m which is mouled into a blank under a pressure of from 3 to 8 kbar and placed into a high-pressure chamber, wherein it is exposed to a pressure of from 40 to 70 kbar at a temperature of from 1,200° to 1,800° C. The time of exposure of the blank to the above-specified temperatures and pressures is varied from 0.1 to =minutes and selected so that the amount of cubic nitride in the compact after the synthesis be within the range of from 20 to 65% by weight. Then the heating is switched off and pressure in the chamber is increased from 80 to 120 kbar. When this pressure is reached, the heating is resumed and temperature is elevated to 1800°-3,000° C. The process is conducted for 0.1 to 1 minute till complete conversion of hexagonal boron nitride to cubic one. Then the heating is switched-off pressure is relieved to the atmospheric value and the final product is extracted from the chamber.

The resulting polycrystal has a compression strength of from 385 to 465 kg/mm$^2$, which is 2–3 times higher than the mechanical strength of polycrystals of cubic boron nitride produced by a known process (e.g. according to French Pat. No. 2,129,200). This advantage is achieved owing to the fact that the process of application of high pressures and temperatures to hexagonal boron nitride is conducted with an improvement resididing in that heating is discontinued when the degree of conversion of hexagonal boron nitride to cubic one reaches 20 to 65% by weight. In the case of conversion of hexagonal boron nitride to cubic one below 20% by weight the amount of the resulting polycrystals of cubic boron nitride which act as crystallization centers at the second stage of the process is insufficient and, furthermore, the blank shrinkage at the second stage of the synthesis be rather high. The presence of more than 65% by weight of cubic boron nitride in the blank after the first stage of the synthesis is inexpedient, since in this case in the volume of the blank in the most heated spots aggregates and agglomerations can be formed, wherein pores can be present which might not disappear upon increasing pressure and remain in the final product.

Consequently, at the first stage there occur densification (shrinkage) of the blank and partial conversion of hexagonal boron nitride to cubic modification, as well as structural changes in the container transmitting pressure, decomposition of certain components of its material and evaporation of volatile phases, wherefore the pressure in the chamber is lowered. The pressure decrease provides a detrimental effect on the polycrystal properties, more specifically on its mechanical strength characteristics.

The pressure increase along with simultaneous temperature elevation during the synthesis sometimes causes partial expulsion of the container material and the sample from the chamber and violation of the process conditions, i.e. shutdown of the process. For this reason, it is advisable to switch-off heating. The moment of heating discontinuation is determined by the content of the cubic boron nitride modification in the blank. This content should be within the range of from 20 to 65% by weight. This technique makes it possible to increase pressure in the chamber while precluding such undesirable phenomena as expulsion of the sample from the chamber and stoppage of the process. When pressure is 80–120 kbar, the heating is resumed and the synthesis temperature is increased within the range of from 1,800° to 3,000° C. The process is conducted for a period of time sufficient for complete conversion of hexagonal boron nitride into its cubic modification.

As a result, polycrystals of cubic boron nitride are obtained which have a fine-grain microstructure and a compression strength 2–3 times superior to that of known polycrystals of cubic boron nitride and equal to 385–465 kg/mm$^2$. This is a totally unexpected result, since it has been impossible to foresee increasing of the polycrystal strength as a result of the above-described process techniques (steps). The increased mechanical strength of the polycrystals makes it possible to use then for the machining of workpieces with intermittent surfaces and materials with a non-uniform structure.

The process for the production of a polycrystal of cubic boron nitride according to the present invention can be effected in the presence of a catalyst contributing to acceleration of the process and a further increase of the polycrystal mechanical strength. It is advisable to use the following catalysts: aluminium, silicon, their alloys, mixtures, borides and nitrides, as well as alloys with transition metals. This is associated with the fact that they are stable in air, do not form compounds decomposable during the process and, simultaneously to acceleration of the process, they provide a positive effect on the physico-mechanical properties of polycrystals. The amount of the catalyst in the hexagonal boron nitride can be varied from 0.5 to 10% by weight.

It is advisable to distribute the catalyst within the blank volume so that it be located non-uniformly, namely in the central portion of hexagonal boron nitride blank the amount of the catalyst should be higher than in the peripheral portion. In the peripheral portion of the blank the content of the catalyst is 2–5 times smaller than in the center. The catalyst is employed as a fine powder which is distributed in each of the portions: central and peripheral-uniformly within the entire volume of hexagonal boron nitride. As a result of such distribution of the catalyst, the crystallization proliferates uniformly from the central portion towards the periphery. This provides a positive effect on the quality of polycrystals of cubic boron nitride, since the number of defects in the polycrystal is reduced, while the compression strength thereof becomes as high as 600 kg/mm$^2$.

Apart from the catalyst, it is possible to introduce into hexagonal boron nitride alloying additives such as boron, boron carbide, silicon carbide, borides, nitrides, carbides and carbonitrides of transition metals which should be uniformly distributed over the blank volume.

For a better understanding of the present invention some specific examples illustrating the process for producing polycrystals of cubic boron nitride are given hereinbelow.

EXAMPLE 1

Hexagonal boron nitride with a particle size of from 0.1 to 15 μm is moulded into a blank under a pressure of from 3 to 8 kbar. The blank is placed into a reaction chamber of a high-pressure apparatus and treated under the pressure of 55 kbar at the temperature of 1,600° C. The time of exposure is 5 minutes, the degree of conversion of hexagonal boron nitride into cubic boron nitride is about 20% by weight. On expiration of the above-indicated time the heating is switched off and pressure in the chamber is increased to 95 kbar.

The heating is resumed and temperature is increased to 2,300° C. The process is conducted for 20 seconds. The resulting polycrystal of cubic boron nitride has a compression strength of 385 kg/mm$^2$.

EXAMPLE 2

A blank is produced from hexagonal boron nitride by following the procedure described in the foregoing Example 1, except that into the central portion of the blank 10% by weight of aluminium and into the peripheral portion—2% by weight of aluminium are introduced. In this Example, as well as in Examples 3 and 4, the catalyst is used as a fine powder which is distributed over the entire volume of the central portion and over the entire volume of the peripheral portion of the blank, in both cases uniformly. The blank is placed into a reaction chamber of a high-pressure apparatus and exposed to the pressure of 40 kbar at the temperature of 1,200° C. for 3 minutes, the degree of conversion of hexagonal boron nitride to cubic one is about 35% by weight. Then the heating is switched-off and the pressure in the chamber is increased to 80 kbar; the heating is switched on and temperature is elevated to 1,800° C. The process is carried out for additional one minute. The heating is discontinued, the pressure is relieved to the atmospheric and the resulting polycrystal of cubic boron nitride is extracted from the chamber. It has the compression strength of 420 kg/mm$^2$.

EXAMPLE 3

The blank is produced as in Example 2 hereinabove, except that its central portion contains 2% by weight of aluminium diboride and the peripheral portion—0.5% by weight of aluminium diboride. The blank is placed into a reaction chamber of a high-pressure apparatus and exposed to the pressure of 70 kbar at the temperature of 1,800° C. for 25 seconds. The degree of conversion of hexagonal boron nitride into cubic boron nitride is equal to 65% by weight. Then the heating is switched off and the pressure in the chamber is increased to 120 kbar. At the pressure of 120 kbar the heating is resumed and the temperature is increased to 3,000° C. The process is continued for 6 seconds, whereafter the heating is switched off, the pressure is relieved to the atmospheric and the resulting polycrystal is extracted from the chamber. The compression strength of the resulting polycrystal of cubic boron nitride is 600 kg/mm$^2$.

EXAMPLE 4

The blank of hexagonal boron nitride is produced as described in Example 3, except that instead of aluminium diboride use is made of an alloy of aluminium with iron and cobalt and an alloying additive—hafnium diboride—is uniformly distributed within the blank volume in the amount of 8% by weight of hexagonal boron nitride. The blank is exposed to the pressure of 60 kbar at the temperature of 1,700° C. for 30 seconds. The degree of conversion of hexagonal boron nitride to its cubic modification is 45% by weight. The heating is switched off and the pressure is increased to 90 kbar. The heating is resumed and the temperature is elevated to 2,400° C. The process is conducted for 10 seconds. Then the heating is discontinued, the pressure is relieved to the atmospheric and the resulting polycrystal is extracted from the chamber. The polycrystal of cubic boron nitride thus obtained has the compression strength of 575 kg/mm$^2$.

EXAMPLE 5

This Example illustrates the manufacture of a polycrystal of cubic boron nitride by the known process and is given for the purpose of comparison.

From hexagonal boron nitride a blank is moulded under a pressure of from 3 to 5 kbar, which is then placed into a reaction chamber of a high-pressure apparatus. The blank is exposed to the pressure of 80 kbar at the temperature of 2,200° C. for 30 seconds. The resulting polycrystal has the compression strength of 170 kg/mm$^2$.

Upon comparison of the values of the crystal strength according to Examples 1 to 4 of the present invention and that according to Example 5, it is clear that the mechanical strength of polycrystals of cubic boron nitride produced according to the present invention is substantially higher than the mechanical strength of the polycrystal produced by the known process.

A cutting tool equipped with the polycrystal produced as described in any of the foregoing Examples 1 to 4 possesses an increased wear-resistance, especially in machining of articles with an intermittent surface (steel, iron, refractory alloys, and the like).

The time of operation of the tool before the first resharpening is 2 times longer than that of the known cutting tool.

What is claimed is:

1. A process for producing a polycrystal of cubic boron nitride, comprising exposure of hexagonal boron nitride to a pressure of from 40 to 70 kbar at a temperature of from 1,200° to 1,800° C.; stopping heating upon achievement of a degree of conversion of hexagonal boron nitride into cubic boron nitride of from 20 to 65% by weight, increasing pressure to a value of from 80 to 120 kbar, resuming the heating upon achievement of this pressure and elevation of temperature to 1,800°–3,000° C. and conducting the process for a period sufficient to fully convert hexagonal boron nitride into cubic boron nitride.

2. A process for producing a polycrystal of cubic boron nitride as claimed in claim 1, wherein into hexagonal boron nitride a catalyst is added in an amount of from 0.5 to 10% by weight to facilitate the conversion of hexagonal boron nitride to cubic boron nitride.

3. A process for producing a polycrystal of cubic boron nitride as claimed in claim 2, wherein use is made of a catalyst selected from the group consisting of silicon, aluminium, mixture of both, alloys thereof, borides, nitrides, as well as alloys of aluminium with transition metals.

4. A process for producing a polycrystal of cubic boron nitride as claimed in claim 2, wherein the catalyst is distributed within the volume of hexagonal boron nitride so that its peripheral portion contains 2–5 times smaller amount of the catalyst than the central portion.

5. A process for producing a polycrystal of cubic boron nitride, wherein the catalyst is used as a fine powder which is uniformly distributed within the central and peripheral portions of the volume of hexagonal boron nitride.

* * * * *